United States Patent [19]
Richison et al.

[11] 3,823,790
[45] July 16, 1974

[54] POWER-OPERATED WHEEL CHAIR

[75] Inventors: Eugene M. Richison; Ethel M. Richison, both of Kinta, Okla.

[73] Assignee: Thomas Conklin, Stigler, Okla.

[22] Filed: Feb. 12, 1973

[21] Appl. No.: 331,908

[52] U.S. Cl. .............................. 180/6.7, 180/9.24
[51] Int. Cl. ......................... B62d 55/04, B62b 9/02
[58] Field of Search ............ 180/6.7, 9.24; 280/5.22

[56] References Cited
UNITED STATES PATENTS

| | | | |
|---|---|---|---|
| 2,751,027 | 6/1956 | McLaughlin | 180/9.24 R |
| 3,195,910 | 7/1965 | Steiner | 285/5.22 |
| 3,276,531 | 10/1966 | Hale | 280/5.22 X |
| 3,346,062 | 10/1967 | Richison | 180/6.7 |
| 3,529,688 | 9/1970 | Bruce | 180/9.24 R |

*Primary Examiner*—Richard J. Johnson
*Attorney, Agent, or Firm*—Robert K. Rhea

[57] ABSTRACT

A power-operated wheelchair including selectively operated pairs of traction belt means driven by stub axles arranged on a central horizontal axis extending transversely of the chair with a forward pair of the traction belt means normally disposed horizontally and a rearward pair of the traction belt means normally disposed in a horizontal and rearwardly upward inclined plane. The wheelchair is normally supported on a horizontal surface by a pair of forward wheels and a rearward caster-type wheel. Control means, including gear trains and motors, drives the traction belt means and positions the plane of the pivotally mounted wheelchair seat in a substantially horizontal plane when the wheelchair is ascending or descending a flight of stairs, or the like, while simultaneously retracting the caster wheel to a position above the depending horizontal plane of the rearward pair of traction belt means.

5 Claims, 10 Drawing Figures

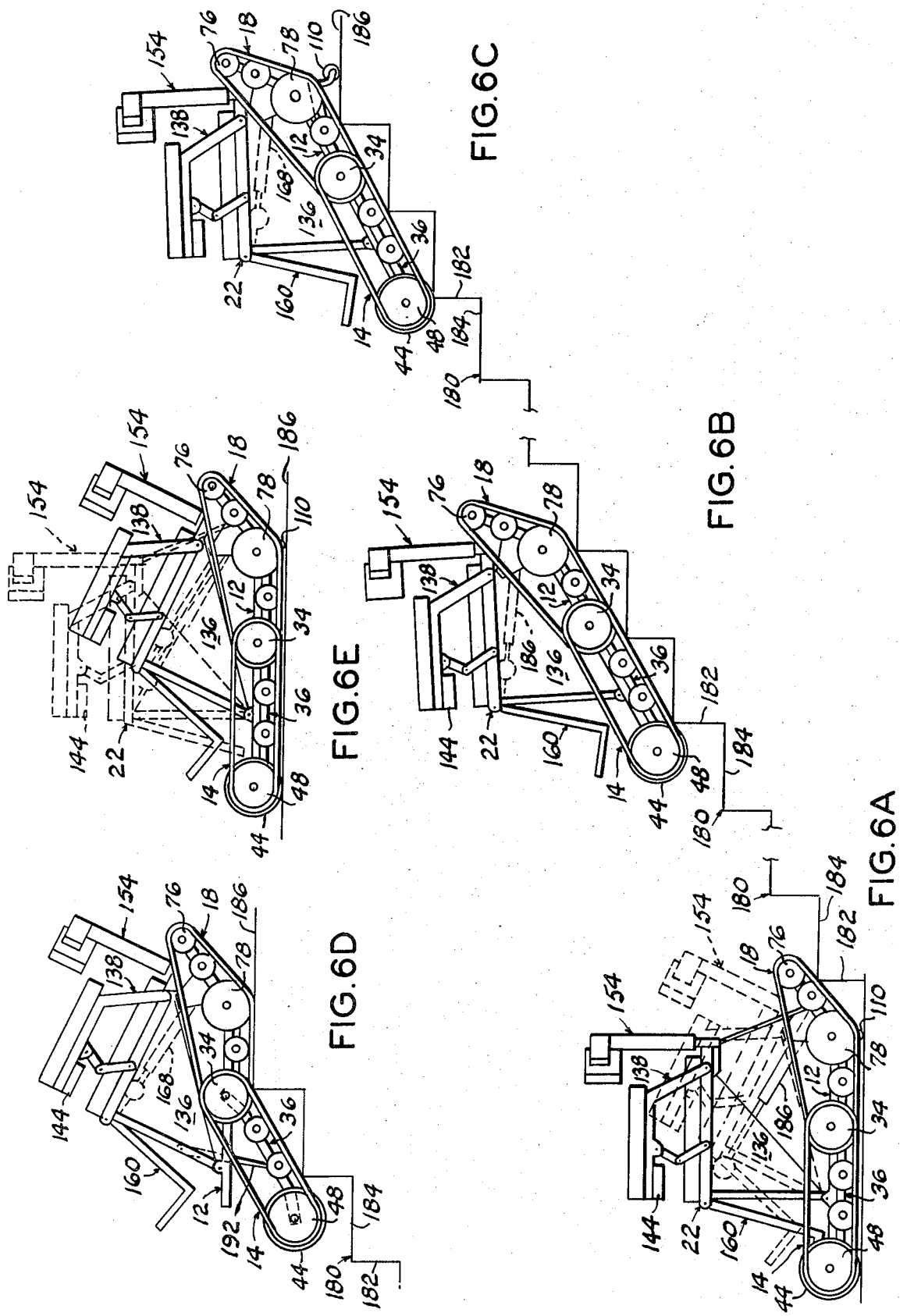

POWER-OPERATED WHEEL CHAIR

BACKGROUND OF THE INVENTION

1. Field of the invention

The present invention relates to wheelchairs and more particularly to a self-propelled single occupant vehicle especially designed for nonambulatory persons which includes occupant control steering and stair climbing and descending means.

2. Description of the prior art

The most pertinent prior patent is U.S. Pat. No. 3,346,062 issued to us on Oct. 10, 1967 for POWER-OPERATED WHEELCHAIR.

The principal distrinction of this invention over the above named patent is the provision of a pair of traction belt means disposed on a horizontal and upwardly and rearwardly inclined plane for engagement with the lowermost stair tread when beginning the ascent of a flight of stairs and an electric motor operated retractor for disposing the plane of the chair seat in a substantially horizontal plane prior to ascending or descending stairs while simultaneously retracting a rearward wheelchair supporting caster wheel from wheelchair supporting contact with a horizontal plane. A further distinction is that a normally horizontal pair of forward traction belt means pivots vertically about a horizontal axis common to both the forward and rearward traction belt means.

SUMMARY OF THE INVENTION

A horizontally disposed frame is provided with a pair of double-groove type driven pulleys mounted, respectively, on a pair of stub axles respectively connected to opposing sides of the frame intermediate its ends. The rearward end portion of the frame is disposed on a rearwardly and upwardly inclined plane and is provided with a plurality of aligned pulleys connected to its respective lateral surfaces in alignment with the innermost groove of the respective driven pulley. A pair of endless tracks are respectively entrained in a vertical plane around the rearwardmost pulley and innermost groove of the dual pulleys. A sub frame underlies the forward end portion of the main frame and is pivotally connected, at its rearward end, with the respective stub axle for vertical pivoting movement toward and away from the depending surfaces of the forward portion of the main frame. Similarly a plurality of pulleys are connected to the respective lateral side surfaces of the sub frame in alignment with the respective outer groove of the dual pulleys for respectively receiving a pair of endless tracks similarly entrained therearound. A pair of front wheels, each having a diameter greater than the vertical distance between the upper and lower limits of the forward tracks, are journalled by the forward end portion of the sub frame between the respective lateral vertical plane of the main frame and the inner vertical plane of the forward pair of tracks for normally supporting the forward end portion of the forward pairs of tracks in spaced relation with respect to a horizontal surface.

A rearwardly disposed caster wheel is connected with a vertically pivoting frame for supporting the wheelchair in combination with the forward wheels on a horizontal plane when the pivoting frame is lowered. A chair frame, including a back, arm, foot and leg rests, is pivotally supported by the main frame for tilting movement toward and away from chair supports secured to the side members of the rearward end portion of the main frame. A motor, connected with the undersurface or the forward limit of the chair frame, operates a screw telescoping into a cylinder connected with the rearward pivoting frame lifts the tilting frame for positioning the caster wheel above the horizontal depending limit of the endless tracks and pivoting the chair to a rearward tilted position or a normally upright position. A cable, connected with the chair back and a cross member of the main frame, limits the forward tilting action of the chair frame. Battery operated motors and gear trains, connected with the respective stub axle, drive the dual pulleys and tracks.

The principle object of this invention is to provide a power driven wheelchair for movement across a horizontal surface which is capable of climbing or descending stairs, or the like.

BRIEF DESCRIPTION OF THE FIGURES

FIG. 5 is a fragmentary elevational view, to another scale, illustrating, by dotted lines, the vertical pivoting movement of the caster supporting pivoting frame; and, FIG. 6A is a simplified side elevational view, to a smaller scale, of the wheelchair in position for climbing stairs illustrating, by dotted lines, the chair frame lowered to a stair climbing position;

FIG. 6B is a similar view illustrating the position of the wheelchair while climbing stairs;

FIG. 6C illustrates the position of the wheelchair when it reaches the horizontal upper limit of the stairs and illustrating the caster wheel in lowered position;

FIG. 6D illustrates the position of the wheelchair as it continues its upward movement beyond the uppermost stair riser; and, FIG. 6E illustrates the position of the wheelchair when it reaches the horizontal limit of the floor above the stairs and illustrates, by dotted lines, the chair frame returned to a normal upright position.

DESCRIPTION OF THE PREFERRED EMBODIMENT

Figure 1:
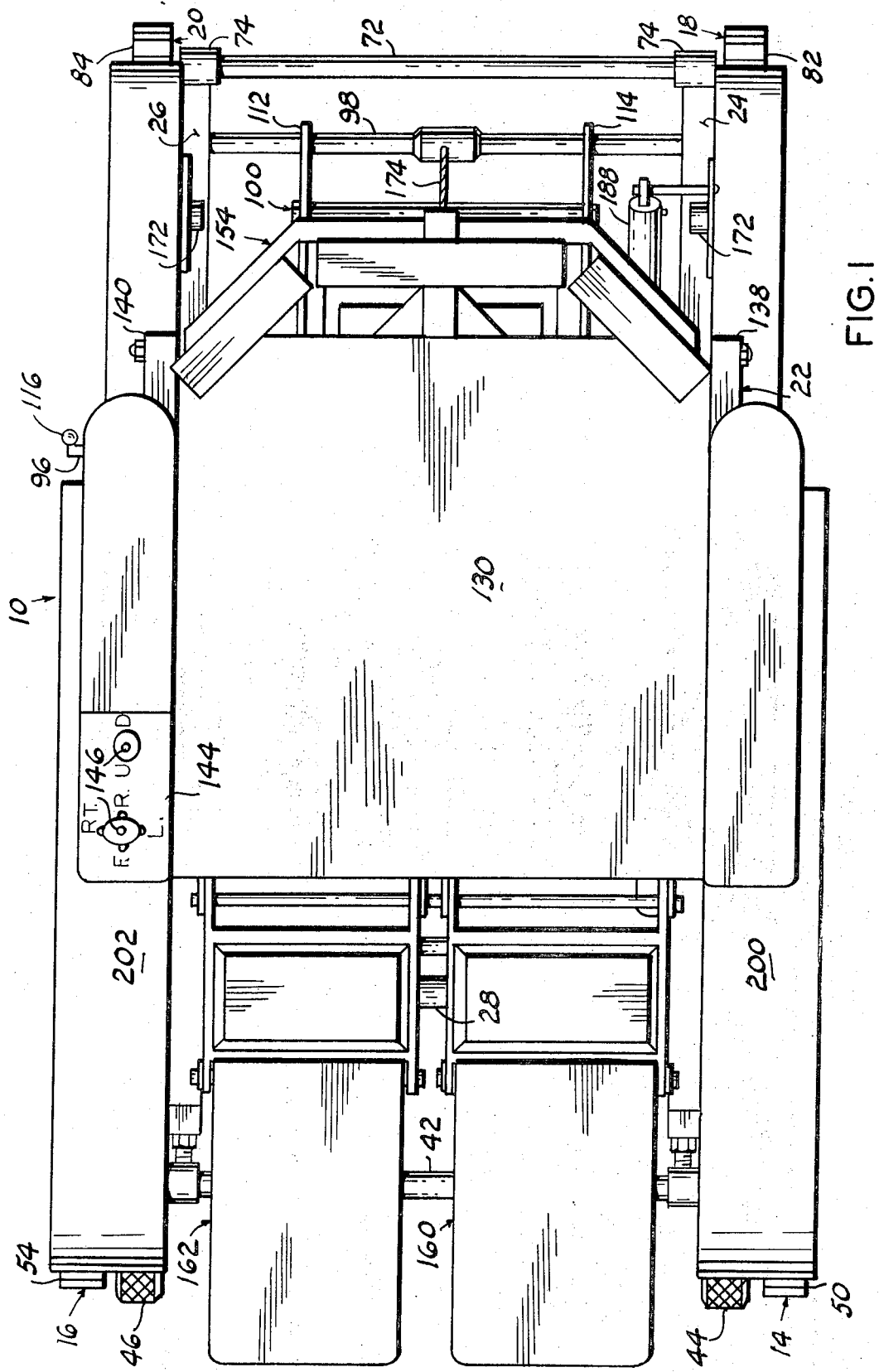
FIG. 1 is a top view of the wheelchair.

Like characters of reference designate like parts in those figures of the drawings in which they occur.

Figure 2:
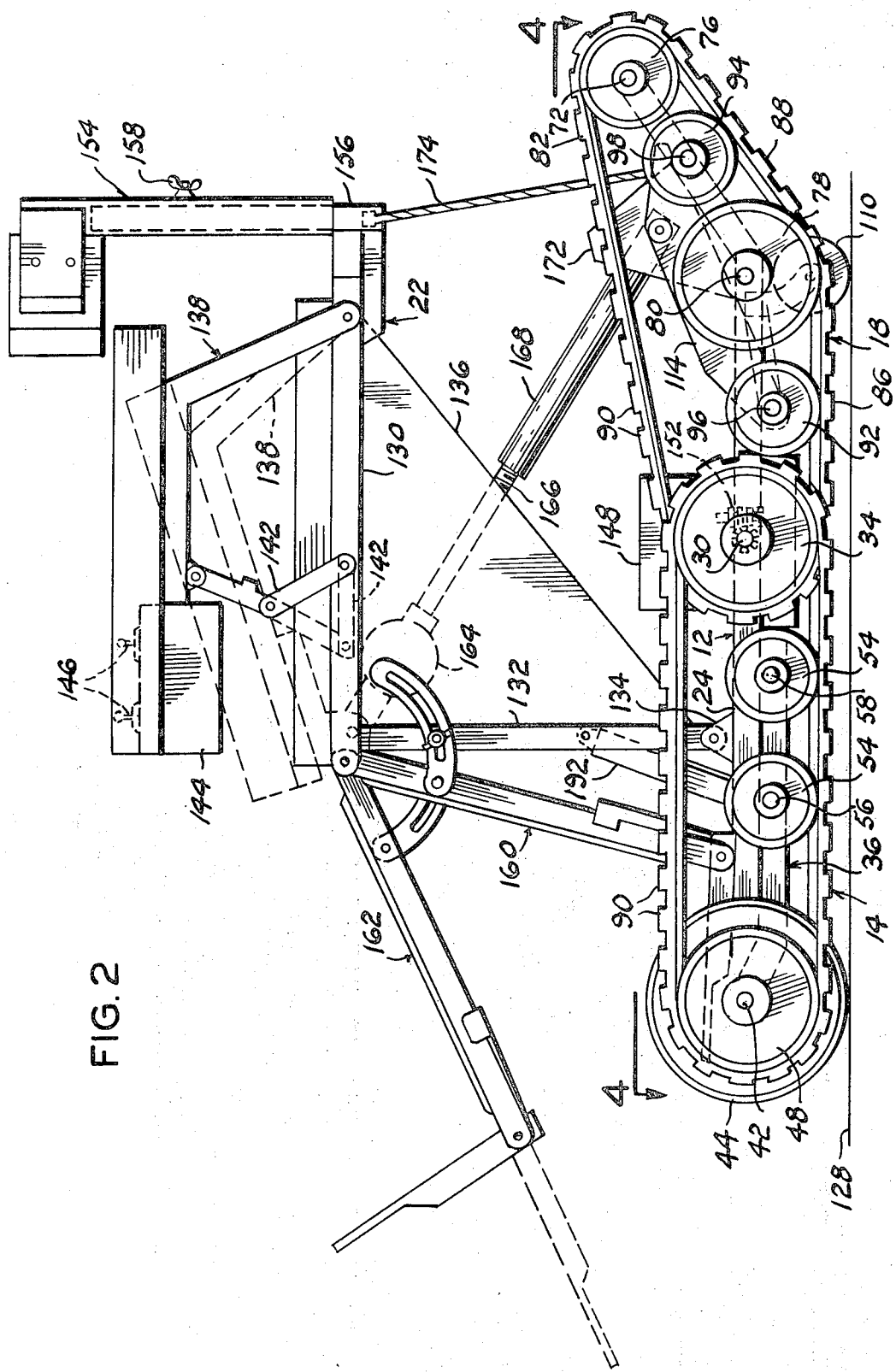
FIG. 2 is a side elevational view of the wheelchair with its traction belt means safety guards removed and illustrating the folding action of the chair arms and foot supports by dotted lines.
Figure 3:
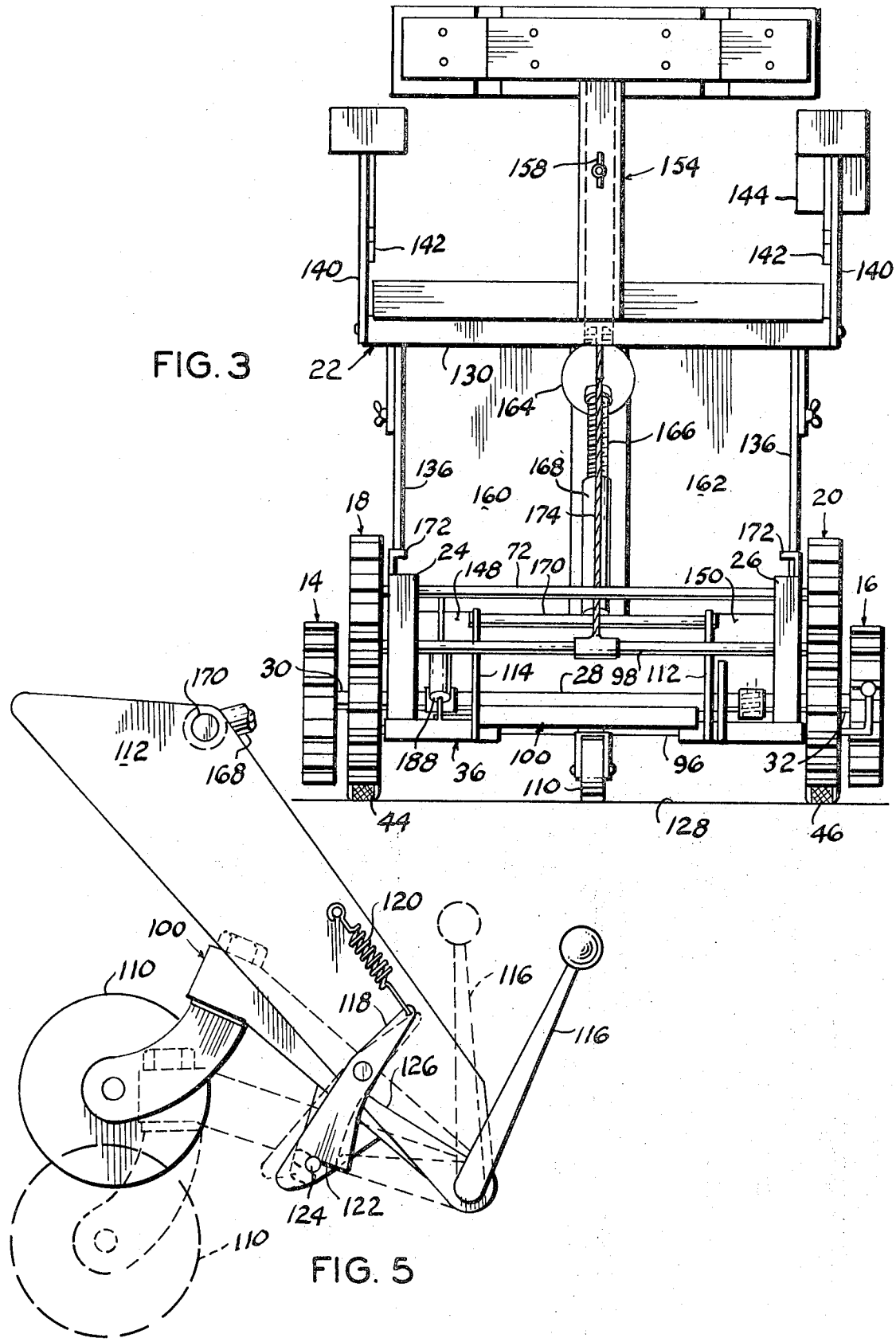
FIG. 3 is a rear end elevational view of the wheelchair.
Figure 4:
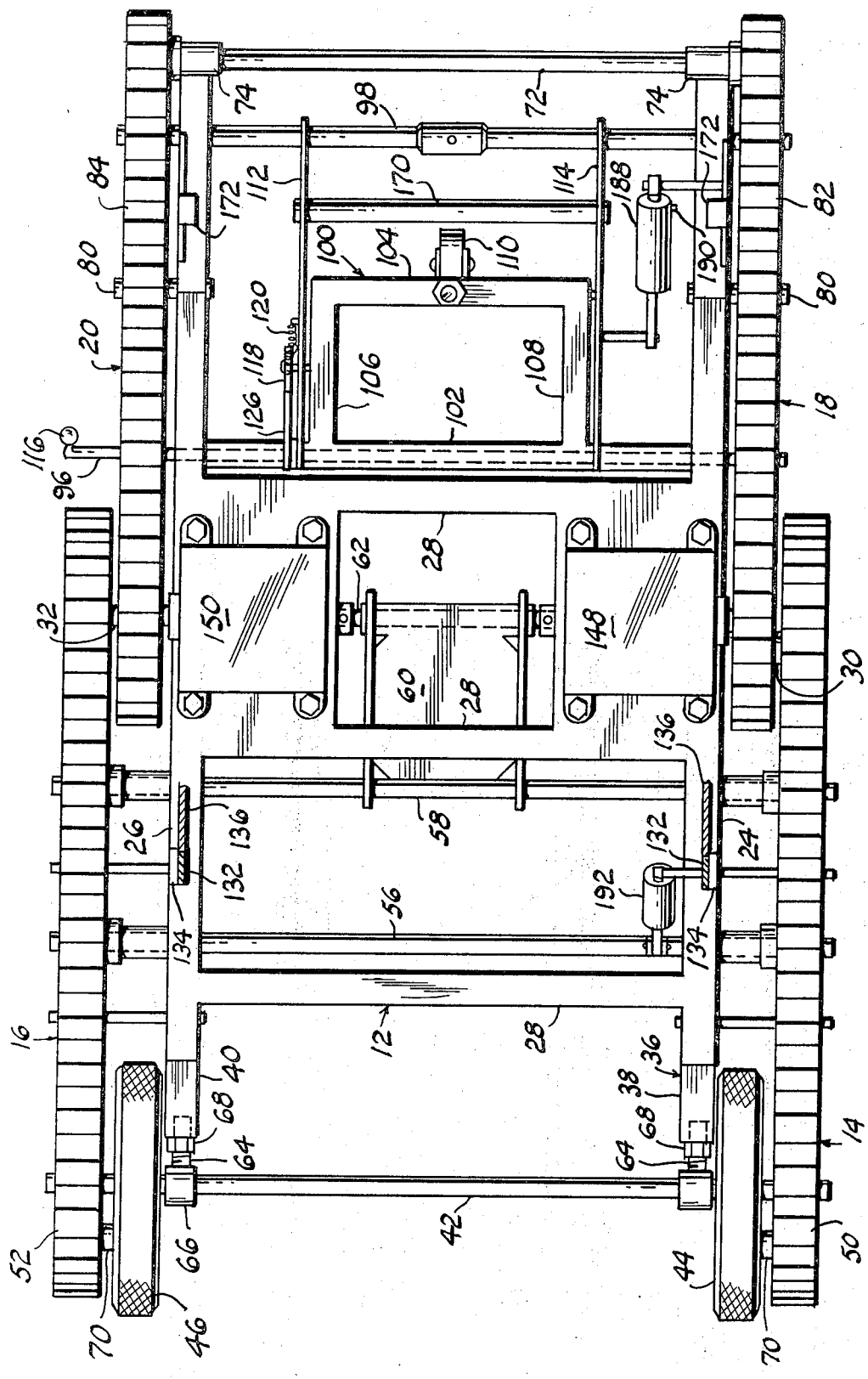
FIG. 4 is a top view of the chair taken substantially along the line 4—4 of FIG. 2.

In the drawings:

The reference numeral 10 indicates the wheelchair, as a whole, comprising a main frame 12 which supports a pair of endless forward traction belt means 14–16, a rearward pair of endless traction belt means 18–20 and a chair frame 22. The main frame 12 is rectangular in plan view comprising a pair of side members 24 and 26 connected in horizontal parallel relation by a plurality of cross members 28. The rearward end portion of the side members are inclined upwardly and rearwardly. A pair of stub axles 30 and 32 project coaxially through the main frame side members 24 and 26, respectively, intermediate their ends. The axles 30 and 32 are journalled by suitable bearings secured to the side members. The outwardly disposed end portion of each of the stub axles 30 and 32 have a dual groove drive pulley 34 secured thereto, only one being shown (FIG. 2). A sub frame 36, rectangular in general configuration, underlies and projects beyond the forward end portion of the main frame 12 and extends angularly upward toward the horizontal plane of the main frame 12. The sub frame includes side members 38 and 40 similarly interconnected by cross members, not shown. A front axle 42 is connected with and extends transversely of the forward limit of the sub frame side members 38 and 40 and journals a pair of front wheels 44 and 46 adjacent its respective ends outwardly of the respective sides of the sub frame. Each end of the front axle 42 has a track pulley 48, only one being shown (FIG. 2), connected thereto in face to face alignment with the outermost one of the grooves of the dual pulleys 34. A pair of flexible endless tracks 50 and 52 are respectively entrained around the front axle pulley and outermost groove of the dual pulleys.

As seen in FIG. 2, the front wheels 44 and 46 are diametrically greater than the diameter of the circular plane generated by the tracks 50 and 52 entrained around the forward pulleys 48 for the purpose presently explained.

Idler pulleys 54, two pairs in the example shown, are connected by suitable bearings with the respective sub frame side members 38 and 40, on axles 56 and 58 extending therebetween with a peripheral portion of the respective idler pulley 54 in supporting contact with the depending run of the respective endless track 50 and 52. Intermediate its ends the axle 58 is connected with a rearwardly extending plate 60 pivotally connected with a support shaft 62 extending between and coaxially aligned with the stub axles 30 and 32 thus permitting vertical pivoting movement of the forward traction belt means 14–16 about the horizontal axis of the support axle 62 for the purposes presently explained.

A screw 64, connected with bearings 66, journalling the front axle 42, enters the forward end of the respective sub frame side member 38 and 40 for adjustable in and out movement as by a nut 68 thus permitting a tightening or loosening of the respective endless track 50 and 52. A pin 70 extends through suitable alignable apertures formed in the respective forward front wheels 44 and 46 and each front pulley 48 for drivably connecting or releasing the wheels and front pulleys.

A rearward axle 72 extends transversely between the rearward limit of the upwardly inclined main frame side members 24 and 26 and is journalled by bearings 74 similarly connected therwith. The respective end portions of the rear axle 72 journal a pulley 76, only one being shown (FIG. 2). A pair of support pulleys 78, diametrically equal with respect to the dual pulleys 34, is connected with the respective main frame side member at the juncture of the horizontal portion of the main frame and its rearward inclined end portions by stub axles 80. A pair of rearward endless tracks 82 and 84 are entrained around the innermost groove of the respective dual pulleys 34, the rearward pulleys 76 and support pulleys 78. Thus, a portion of the depending run of the respective endless tracks 82 and 84 are disposed in a horizontal plane, as at 86, in cooperation with the depending horizontal run of the forward endless tracks 50–52 while a portion of the depending run of the rearward tracks 82 and 84 are disposed on an incline, as at 88, for engaging stair treads, or the like, as presently explained.

As shown in the drawings, the respective endless tracks 50–52 and 82–84 are each provided with transverse lugs 90 for the purposes of engaging and gripping the forward edge portion of stair treads when the wheelchair ascends or descends a flight of stairs.

Two pairs of idler pulleys 92 and 94, only one of each being shown, are mounted on the respective ends of idler axles 96 and 98 extending transversely between the main frame side members for supporting the depending run of the inclined portion of the rearward tracks when passing over stair treads, or the like.

A pivoting frame 100, comprising a forward member 102 and a rearward member 104 interconnected by side members 106 and 108, is pivotally connected by its forward member 102 to the idler axle 96 for vertical pivoting movement of the pivoting frame above the horizontal axis of the idler axle 96.

A caster wheel 110 is pivotally connected to the pivoting frame rearward member 104 in a conventional manner. A pair of elongated arms 112 and 114, platelike in general configuration, are vertically disposed edgewise on the respective side of the pivoting frame and are connected with the pivoting frame member 102. The rearward end portion of the arms 112 and 114 extend angularly upward and overlie, at their rearward end portions, the idler axle 98. The idler axle 96 extends laterally beyond the rearward traction belt means 20 and is turned upwardly to form a handle 116 for angular rotation of the idler axle 96 to release and latch the pivoting frame 100, as shown in FIG. 5.

This is accomplished by a latch arm 118 pivotally connected with the plate arm 112, with a spring 120 normally urging the latch arm 118 in a counterclockwise direction, as viewed in FIG. 5. The depending end portion of the latch arm is provided with a slot 122 normally engaging a pin 124 secured to the pivoting frame side member 106 normally maintaining the caster wheel 110 in the solid line position of FIG. 5. A cam 126, secured to the idler axle 96, overcomes the resistance of the spring 120 and releases the pin 124 from engagement with the latch arm 118 for releasing the caster wheel 110 from its solid line position of FIG. 5, when the handle 116 is moved to its dotted line position. The caster wheel 110 and the front wheels 44 and 46 normally support the respective pairs of traction belt means in spaced relation with respect to a horizontal surface, such as a floor, indicated by the line 128.

The chair frame 22 comprises a normally horizontal seat portion 130 having a pair of depending legs 132 pivotally connected respectively with ears 134 secured to the forward portion of the main frame side members or rails 24 and 26. A triangular-shaped web member 136 is connected with the respective side edge of the seat portion 130 and legs 132. The seat frame further includes a pair of arm rests or supports 138 and 140 connected with the respective side of the seat portion 130. The arm rests 138 and 140 are each provided with a pair of toggle links 142 which, when released, permits the arm rests to pivot at their forward end portions toward the forward end portion of the seat portion 130. One of the arm rests, for example the arm rest 140, is provided with a control unit 144 including electrical controls 146 which are respectively connected in a conventional manner with battery operated reversible motors and gear trains 148 and 150 mounted on the main frame and each including worm gear means 152 for driving the respective stub axle 30 and 32. The seat frame 22 further includes a back rest 154 telescopically receiving a box-channel member 156 for vertical adjustment of the back rest by a thumb screw 158. Right and left occupant leg and foot support members 160 and 162, respectively, are pivotally connected with the forward end portions of the seat portion 130 in a substantially conventional manner.

A reversible electric motor 164 is connected with the depending surface of the forward end portion of the seat frame portion 130 medially its width and is operated by the control panel 144. The drive shaft of the motor is coaxially connected with a retractor means comprising a threaded screw 166 cooperatively received by a cylinder 168 connected at its depending end with a transverse support rod 170 extending between and connected with the plate arms 112 and 114 adjacent their rearward limit. The purpose of the motor 164 and retractor means is to raise and lower the seat frame 22 with respect to the horizontal portion of the main frame 12. Rotation of the threaded screw 166 into its cylinder 168 moves the seat frame 22 from its solid line position to its dotted line position of FIG. 6A wherein the hypotenuse edge of the triangular web 136 contacts seat supports 172 mounted on the rearwardly and upwardly projecting end portions of the main frame side members 24 and 26 and projecting above the upper inclined run of the rearward endless traction belt means 18 and 20. The seat supports 172 support the mass of the seat frame 22 and its occupant when the seat frame 22 is lowered. Conversely, the seat frame 22 is raised from its lowered position by reversing the direction of rotation of the screw 166 wherein a cable 174, or the like, slidably connected with the chair back channel 156, at one end and rigidly connected at its other end to the idler axle 98, limits the forward pivoting action of the chair frame 22 to a parallel position of the seat portion 130 with respect to the main frame 12. When the chair frame 22 is lowered, as just described, the cable 174 slidably extends upwardly into the back rest channel 156.

Operation

In normal operation on a horizontal support surface the seat frame portion 130 is disposed horizontally and parallel with the main frame 12 and the wheelchair is supported by the front wheels 44 and 46 and caster wheel 110 so that the motors and gear trains 148 and 150 rotate the respective pairs of endless tracks for forward or rearward travel wherein the forward pulleys 48 drive the front wheels 44 and 46. Turning is accomplished, to the right or left, by stopping one of the motor gear trains 148 or 150 while the other continues to operate.

Referring also to FIGS. 6A through 6E, the wheelchair climbs a flight of stairs 180 having a plurality of risers 182 joining a cooperating plurality of stair treads 184 providing access to an upper landing 186 disposed in a horizontal plane above the floor 128. The wheelchair is backed toward the lowermost end or beginning of the flight of stairs 180 by reversing the wheelchair motor gear trains 148 and 150 until the upwardly inclined depending runs 88 of the rearward endless tracks engage the forward edge of the lowermost stair tread 184. The motor 164 is operated to insert the screw 166 into the cylinder 168 to lower the chair frame 22 to the dotted line position of FIG. 6A. At the beginning of this action the cylinder first lifts the pair of plates 112 and 114 and the pivoting frame 100 so that the caster wheel 110 is lifted out of contact with the floor 128 and maintains the caster wheel in this lifted position while the chair frame webs are supported by the chair supports 172. The motor gear trains 148 and 150 are actuated to rotate the endless traction belt means which, by their lugs 90 engaging the leading edge of the stair treads 184, progressively moves the wheelchair up the flight of stairs, as shown in FIG. 6B. When the wheelchair reaches and extends beyond the uppermost stair riser 182, as seen in FIG. 6C, the operator manually moves the handle 116 to release the latch arm 118 which allows the pivoting frame 100 to fall by gravity until the caster wheel 110 engages the surface of the landing 186.

A first shock absorber, comprising a cylinder 188, is connected at one end with the main frame side member 24 and is connected at its other end with the pivoting frame 100. The cylinder is provided with a small orifice 190 admitting air to the interior of the cylinder in shock absorbing fashion so that when the wheelchair continues its movement toward the landing 186 and the position of FIG. 6D, downward movement of the rearward portion of the wheelchair toward the landing 186 is cushioned by air being exhausted through the cylinder orifice 190. Simultaneously the sub frame maintains the forward tracks 50 and 52 in contact with the stair treads. When the pairs of wheelchair tracks are fully supported by the landing 186, as shown by FIG. 6E, the motor 164 is actuated to rotate the screw 166 in the other direction which raises the chair frame 22 to its dotted line position of this Figure and simultaneously latches the caster wheel 110 in wheelchair supporting relation.

FIG. 6D also illustrates the position of the wheelchair when beginning descent of the stairs 180. When the wheelchair reaches the position in which the axis of the stub shafts 30 and 32 are positioned above the uppermost riser 182 the sub frame 36 and forward tracks 50–52 pivot downwardly into contact with the leading edge of the stair treads. A second air cylinder 192, is connected with the idler axle 56, at one end and with one leg portion of the chair frame, to cushion the downward movement of the traction belt means 14 and 16 as they engage the stair treads. Similarly, this cylinder 192 cushions the forward and downwardly tilting action of the main frame 12 in its movement toward the sub frame 36 when the center gravity of the wheelchair and its occupant moves beyond the vertical plane of the uppermost stair riser so that the wheelchair, when descending stairs, is in the position of FIG. 6B with downward movement of the wheelchair along the inclined plane of the stairs being controlled by a desired rate of travel of the motor gear trains 148 and 150. When the wheelchair reaches the lower limit of the stairs and is positioned substantially as shown in FIG. 6A, the chair frame 22 is again raised to the solid line position of FIG. 6A by operation of the screw 166, as disclosed hereinabove.

As a safety feature traction belt shield or guard means 200 and 202 are supported by the main frame 12 and cover the upwardly disposed runs of the endless belts.

Obviously the invention is susceptible to changes or alterations without defeating its practicability, therefore, we do not wish to be confined to the preferred embodiment shown in the drawings and described herein.

We claim:

1. A power-driven wheelchair, comprising:
   a main frame including parallel cross members connecting horizontally aligned side members having forward ends and terminating rearwardly in parallel transversely aligned angularly upward and rearwardly directed end portions;
   a chair frame pivotally supported by said main frame for pivoting movement about a horizontal axis toward and away from the rearward end portion of said main frame;
   a pair of stud axles journalled by said main frame intermediate its ends and respectively projecting, at one end portion, laterally of said frame side members;
   a sub frame underlying the forward end portions of said main frame side members and being pivotally connected with said main frame for vertical pivoting movement of said sub frame about a horizontal axis intermediate the length of said main frame;
   two pairs of endless traction belt means supported respectively by said main frame and said sub frame and driven by the respective laterally projecting end portion of said stub axles;
   a pair of ground-engaging wheels connected, respectively, with the forward end portions of said sub frame;
   a pivoting frame connected with said main frame rearwardly of said stub axles for vertical pivoting movement about a horizontal axis;
   a caster wheel connected with said pivoting frame rearwardly of its connection with said main frame for normally horizontally supporting said endless traction belt means, in combination with said ground-engaging wheels, in a plane spaced above said ground;
   chair frame retractor means connected with said chair frame and said pivoting frame, respectively, for lowering said chair frame toward said main frame while raising said pivoting frame and vice versa; and,
   selectively operable power means connected in driving relation with said stub axles.

2. The wheelchair according to claim 1 in which said chair frame retractor means includes:
   a reversible motor connected with said chair frame, said motor having a drive shaft;
   an internally threaded cylinder pivotally connected at one end with said pivoting frame and projecting at its other end portion toward said motor; and,
   a screw shaft coaxially connected with said motor drive shaft and threadedly received by said internally threaded cylinder.

3. The wheelchair according to claim 2 and further including:
   a rotatable shaft extending transversely through said main frame for connecting said pivoting frame to said main frame;
   a chair frame support plate connected with said rotatable shaft at the respective opposing sides of said pivoting frame;
   a latch mounted on one said chair frame support plate and releaseably supporting said pivoting frame;
   a cam connected with said rotatable shaft and having a cam surface bearing against said latch; and,
   a handle connected with one end of said rotatable shaft for releasing said latch and permitting said pivoting frame to fall by gravity toward a caster wheel contacting horizontal surface.

4. The wheelchair according to claim 3 and further including:
   first shock absorbing means connected with said main frame and said pivoting frame for cushioning downward movement of the rearward end portion of said pivoting frame and said main frame toward a horizontal surface.

5. The wheelchair according to claim 4 and further including:
   second shock absorbing means extending between said main frame and said sub frame for cushioning movement of the forward end portion of said main frame toward said sub frame when said wheelchair is moved from a horizontal supporting plane to a downwardly inclined plane.

* * * * *